(12) United States Patent
Gleixner (10) Patent No.: US 8,897,768 B2
(45) Date of Patent: Nov. 25, 2014

(54) METHOD FOR SELECTING AND ESTABLISHING A D2D COMMUNICATION PATH IN MTC CAPILLARY NETWORKS

(71) Applicant: Industrial Technology Research Institute, Hsinchu (TW)

(72) Inventor: Stephan Gleixner, Zhubei (TW)

(73) Assignee: Industrial Technology Research Institute, Hsinchu (TW)

(*) Notice: Subject to any disclaimer, the term of this patent is extended or adjusted under 35 U.S.C. 154(b) by 254 days.

(21) Appl. No.: 13/687,301

(22) Filed: Nov. 28, 2012

(65) Prior Publication Data

US 2014/0148153 A1    May 29, 2014

(51) Int. Cl.
*H04W 4/00* (2009.01)
*H04W 76/02* (2009.01)

(52) U.S. Cl.
CPC ............ *H04W 4/005* (2013.01); *H04W 76/023* (2013.01)
USPC ................... 455/426.1; 455/435.1; 455/435.2; 455/435.3; 455/458

(58) Field of Classification Search
USPC ................. 455/426.1, 458, 435.1–435.3, 525
See application file for complete search history.

(56) References Cited

U.S. PATENT DOCUMENTS

| | | |
|---|---|---|
| 2010/0009675 A1 | 1/2010 | Wijting et al. |
| 2010/0011110 A1 | 1/2010 | Doppler et al. |
| 2011/0098043 A1 | 4/2011 | Yu et al. |
| 2011/0117907 A1 | 5/2011 | Hooli et al. |
| 2011/0134827 A1 | 6/2011 | Hooli et al. |
| 2013/0044661 A1* | 2/2013 | Jokimies et al. ............ 370/311 |
| 2013/0172036 A1* | 7/2013 | Mikl s et al. ................ 455/517 |
| 2013/0315129 A1* | 11/2013 | Kim et al. .................... 370/312 |
| 2014/0140296 A1* | 5/2014 | Choi et al. ................... 370/329 |

FOREIGN PATENT DOCUMENTS

| | | |
|---|---|---|
| WO | 2011007085 A1 | 1/2011 |
| WO | 2011036507 A1 | 3/2011 |

OTHER PUBLICATIONS

Fodor et al., "Design aspects of network assisted device-to-device communications", Communications Magazine, IEEE, p. 170-177, 2012.
Doppler et al., "Device-to-Device communications; functional prospects for LTE-Advanced networks", Communications Workshops, 2009. ICC Workshops 2009. IEEE International Conference on, p. 1-6, 2009.

(Continued)

*Primary Examiner* — Wayne Cai
(74) *Attorney, Agent, or Firm* — Rabin & Berdo, P.C.

(57) ABSTRACT

A method for selecting and establishing a device-to-device (D2D) communication path in MTC capillary network, to be executed on an MTC device, is provided, including receiving a paging request; piggybacking the paging request into a probe/beacon signal and sending said probe/beacon signal piggybacked with said paging request to an MTC gateway, when said MTC device being configured to use said MTC gateway; determining a D2D link quality and report result to an eNB connected to said MTC gateway, when receiving a probe/beacon signal without paging response from said MTC gateway; and when receiving a probe/beacon signal with paging response from said MTC gateway: setting up a D2D communication link, when said received response indicating said probe/beacon signal with paging request being accepted, or, setting up a direct cellular connection when said received response indicating said probe/beacon signal with paging request being rejected.

19 Claims, 12 Drawing Sheets

(56) References Cited

OTHER PUBLICATIONS

Doppler et al.,"Mode selection for Device-to-Device Communication underlaying an LTE-Advanced Network", Wireless Communications and Networking Conference (WCNC), 2010 IEEE, p. 1-6, 2010.

Chae et al., "Radio Resource Allocation Scheme for Device-to-Device Communication in Cellular Networks Using Fractional Frequency Reuse", Communications (APCC), 2011 17th Asia-Pacific Conference on | Sutera Harbour Resort, Kota Kinabalu, Sabah, Malaysia, p. 58-62 , Oct. 2-5, 2011.

Gu et al., "Dynamic Power Control Mechanism for Interference Coordination of Device-to-Device Communication in Cellular Networks", Ubiquitous and Future Networks, (ICUFN), 2011 Third International Conference, p. 71-75, 2011.

Lee et al., "A Session Setup Mechanism Based on Selective Scanning for Device-to-Device Communication in Cellular Networks", Communications (APCC), 2011, 17th Asia-Pacific Conference on| Sutera Harbour Resort, Kota Kinabalu, Sabah, Malaysia, p. 677-681, Oct. 2-5, 2011.

* cited by examiner

METHOD FOR SELECTING AND ESTABLISHING A D2D COMMUNICATION PATH IN MTC CAPILLARY NETWORKS

TECHNICAL FIELD

The technical field relates to a method for selecting and establishing a device-to-device (D2D) communication path in Machine-Type Communication (MTC) capillary network.

BACKGROUND

Machine-to-Machine (M2M) communication enables machines to communicate directly with one another and is expanding rapidly because of the potential to generate significant revenue for mobile network operators. In 3rd Generation Partnership Project (3GPP) context, M2M is also referred to as MTC. MTC uses devices that capture certain events such as temperature, gas or water consumption, and then sent the event over a wired or wireless network to an MTC application. For example, smart meters with metering application are expected to be one among the early MTC devices deployed. Many other MTC devices such as e-health monitors, manufacturing management or tracking in security application, are envisioned and are expected to be widely used in the near future.

Figure 1:
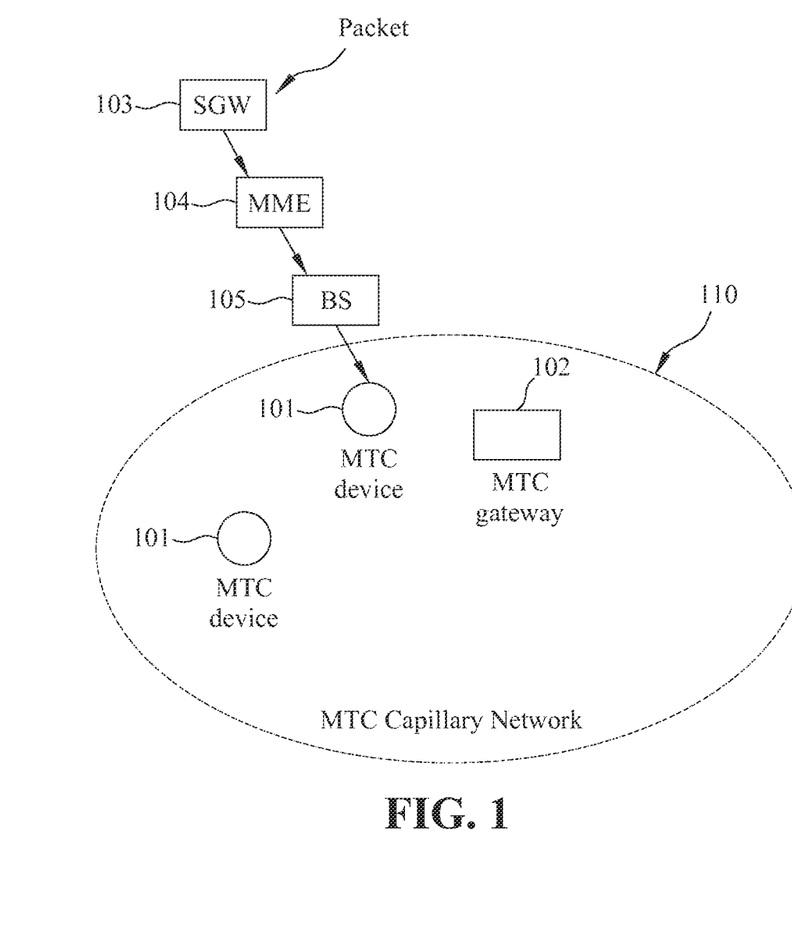
FIG. 1 shows a schematic view of the bearer path of MTC device in a conventional communication environment.

FIG. 1 shows a schematic view of the bearer path of MTC device in a conventional communication environment. As shown in FIG. 1, an MTC capillary network 110 includes a plurality of MTC devices 101 and typically one MTC gateway device 102. When a serving gateway (SGW) 103 receives packets for an MTC device 101, SGW 103 sends a downlink (DL) data notification to mobility management entity (MME) 104. Upon receiving DL data notification from SGW 103, MME 104 sends a paging signal to an evolved Node B (eNB) or base station (BS) 105, which, in turn, relays the paging signal to MTC device 101. In response, MTC device 101 establishes a data path through BS 105 to SGW 103 for subsequent MTC data communication. In the above scenario, MTC gateway device 102 is not involved in the bearer path establishment.

Among other ongoing research activities and work, the 3GPP established common and specific service requirements including MTC communication scenarios. According to those, MTC devices may communicate directly with one or more MTC servers. In another communication scenario, so-called local-access devices without 3GPP communication capability are located in a MTC capillary network which provides local connectivity between the local-access devices within its coverage and a MTC gateway device. The MTC gateway device is an MTC device which acts as a gateway for local-access devices in a MTC capillary network to communicate through a public land mobile network (PLMN) with one or more MTC servers. In general, MTC devices may be equipped with both 3GPP and non-3GPP communication capabilities.

On the other hand, network assisted device-to-device D2D communication has been proposed as a means of taking advantage of the physical proximity of communicating devices with the aim to improve local services. D2D communication may provide the following advantages: (1) the proximity of user equipments may allow for extremely high bit rates, low delay and low power consumption; (2) the radio resources may be simultaneously used by cellular as well as D2D links, which improves the usage efficiency of radio resources; and (3) only a single link is used in the D2D mode rather than using both an uplink and a downlink resource when communication via the access point in the cellular mode.

Figure 2:
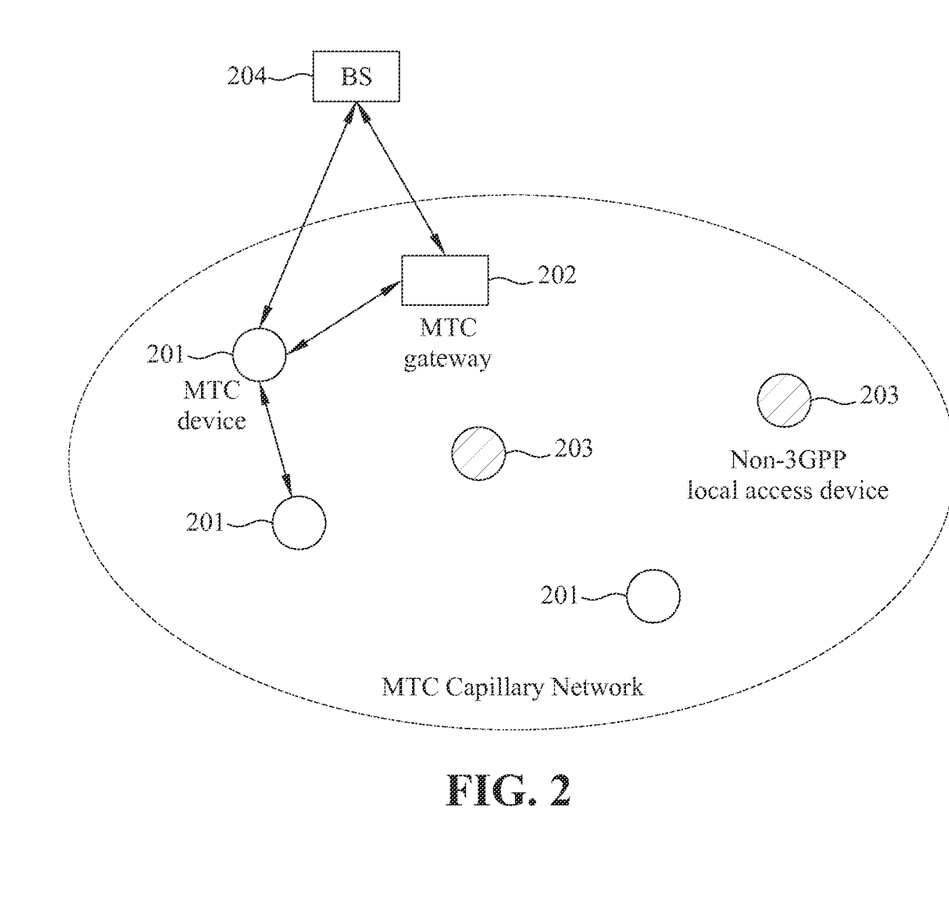
FIG. 2 shows a schematic view of a MTC capillary network including MTC devices with both 3GPP capability and other wireless interface and non-3GPP local access devices.

FIG. 2 shows a schematic view of a MTC capillary network including MTC devices with both 3GPP capability and other wireless interface and non-3GPP local access devices. As shown in FIG. 2, MTC capillary network includes a plurality of MTC devices 201, at least a MTC gateway device 202 and a plurality of non-3GPP local access devices 203. A D2D connection can be established between two MTC devices 201, two MTC gateway devices 202 or between an MTC device 201 and an MTC gateway device 202.

When a user equipment (UE) A intends to establish a connection to UE B, a network-assisted D2D link establishment technique may initiate a procedure including: checking whether UE A and UE B are candidates for a D2D connection; triggering transmission of beacon signals to determine link quality; and deciding whether D2D is suitable and allocating resources if so.

SUMMARY

An embodiment describes an MTC device process executed on an MTC device in a method for selecting and establishing a D2D communication path in MTC capillary network, MTC device process including: receiving a paging request; piggybacking the paging request into a probe/beacon signal and sending said probe/beacon signal piggybacked with said paging request to an MTC gateway, when said MTC device being configured to use said MTC gateway; determining a D2D link quality and report result to an eNB connected to said MTC gateway, when receiving a probe/beacon signal without paging response from said MTC gateway; and when receiving a probe/beacon signal with paging response from said MTC gateway: setting up a D2D communication link, when said received response indicating said probe/beacon signal with paging request being accepted, or, setting up a direct cellular connection when said received response indicating said probe/beacon signal with paging request being rejected.

Another embodiment describes an MTC gateway process executed on an MTC gateway in a method for selecting and establishing a D2D communication path in MTC capillary networks, MTC gateway process including: receiving a probe/beacon signal piggybacked with paging request from an MTC device; determining D2D link quality and reporting result to an eNB and sending a probe/beacon without paging response to said MTC device, when said MTC device being authorized to use said MTC gateway; and when receiving a response from said eNB: sending a response to said MTC device to reject said probe/beacon signal with paging request, when the received response indicating not to use D2D communication, or, sending a response to said MTC device to accept said probe/beacon signal with paging request, when the received response indicating to use D2D communication.

Yet another embodiment described a method for selecting and establishing a D2D communication path in MTC capillary network, the MTC capillary network having a plurality of MTC devices and an MTC gateway, the method including: receiving a paging request by said MTC device; piggybacking a paging request into a probe/beacon signal and sending said probe/beacon signal piggybacked with said paging request to said MTC gateway when said MTC device determining being configured to use an MTC gateway, and waiting until receiving a response from said MTC gateway; receiving a probe/beacon signal piggybacked with paging request from said MTC device by said MTC gateway; determining D2D a link quality and reporting result to an eNB and sending a probe/beacon without paging response to said MTC device when said MTC gateway determining said MTC device being authorized to use said MTC gateway; when said MTC gateway receiving a response from said eNB, said MTC gateway: sending a response to said MTC device to reject said probe/beacon signal with paging request when the received response from said eNB indicating not to use a D2D communication, or, sending a response to said MTC device to accept said probe/beacon signal with paging request when the received response indicating to use a D2D communication; when said MTC device receiving a response from said MTC gateway, said MTC device: proceeding to determine a D2D link quality and reporting result to an eNB connected to said MTC gateway when said received response from said MTC gateway being a probe/beacon signal without paging response, and returning to waiting until receiving a response from said MTC gateway; and setting up a D2D communication link when said received response from said MTC gateway indicating that said probe/beacon signal with paging request being accepted, or, setting up a direct cellular connection, when said received response from said MTC gateway indicating said probe/beacon signal with paging request being rejected.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The exemplary embodiment describes an enhanced paging procedure to trigger a mechanism to either set up a D2D connection between a paged terminal and an MTC gateway or to reject D2D connection setup and request the paged terminal to set up a conventional connection, wherein the mechanism includes paging enhancement, such as, using Paging Accept to indicate that D2D is possible or using Paging Reject to indicate D2D is not possible.

When down link packet is available for a 3GPP capable MTC device that is in idle state then the network initiates a paging procedure to request the device to change from idle state to connected state and to establish the evolved packet system (EPS) bearer(s).

When the MTC device is in close proximity to an MTC gateway to which the MTC device has an association to, establishing the connection through an alternative path from the MTC device to the MTC gateway, i.e., a D2D connection, and then from MTC gateway to the network, i.e., MTC server, may be beneficial for the network and/or the MTC user. This alternative path is especially beneficial when the MTC gateway has already an active connection to the network because many signaling messages can be saved and also less system resource would be required, as shown in FIG. 3.

Figure 3:
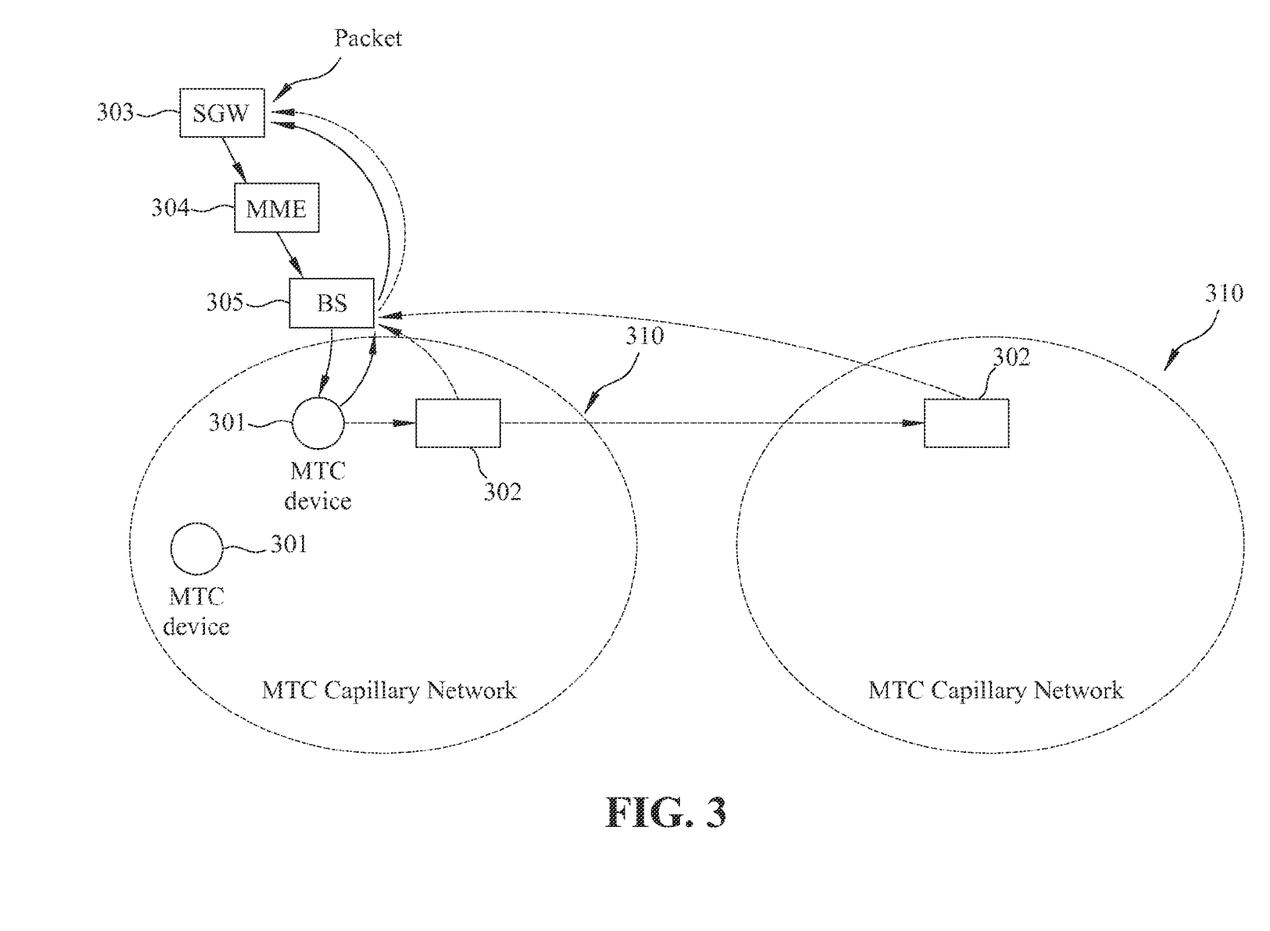
FIG. 3 shows a schematic view of the bearer path of MTC device in an MTC capillary network environment according to an exemplary embodiment of the present disclosure.

FIG. 3 shows a schematic view of the bearer path of MTC device in an MTC capillary network environment according to an exemplary embodiment. As shown in FIG. 3, an MTC capillary network 310 includes a plurality of MTC devices 301, at least a MTC gateway device 302. In comparison with FIG. 1 wherein the connection from the MTC device through BS to SGW, when the MTC capillary network 110 supports the method of the present invention, additional bearer paths can be established, for example, from MTC device 301 through one or more MTC gateways 302 and BS 305 to SGW 303. In other words, in an embodiment, MTC device 301 and MTC gateway 302 can execute an enhanced paging procedure to determine whether the alternative bearer paths should be established for the D2D connection. In FIG. 3, the bearer path depicted with solid line is conventional bearer path, and the bearer path depicted with dash line is the alternative bearer path that can be established in system supporting the present disclosure.

Figure 4:
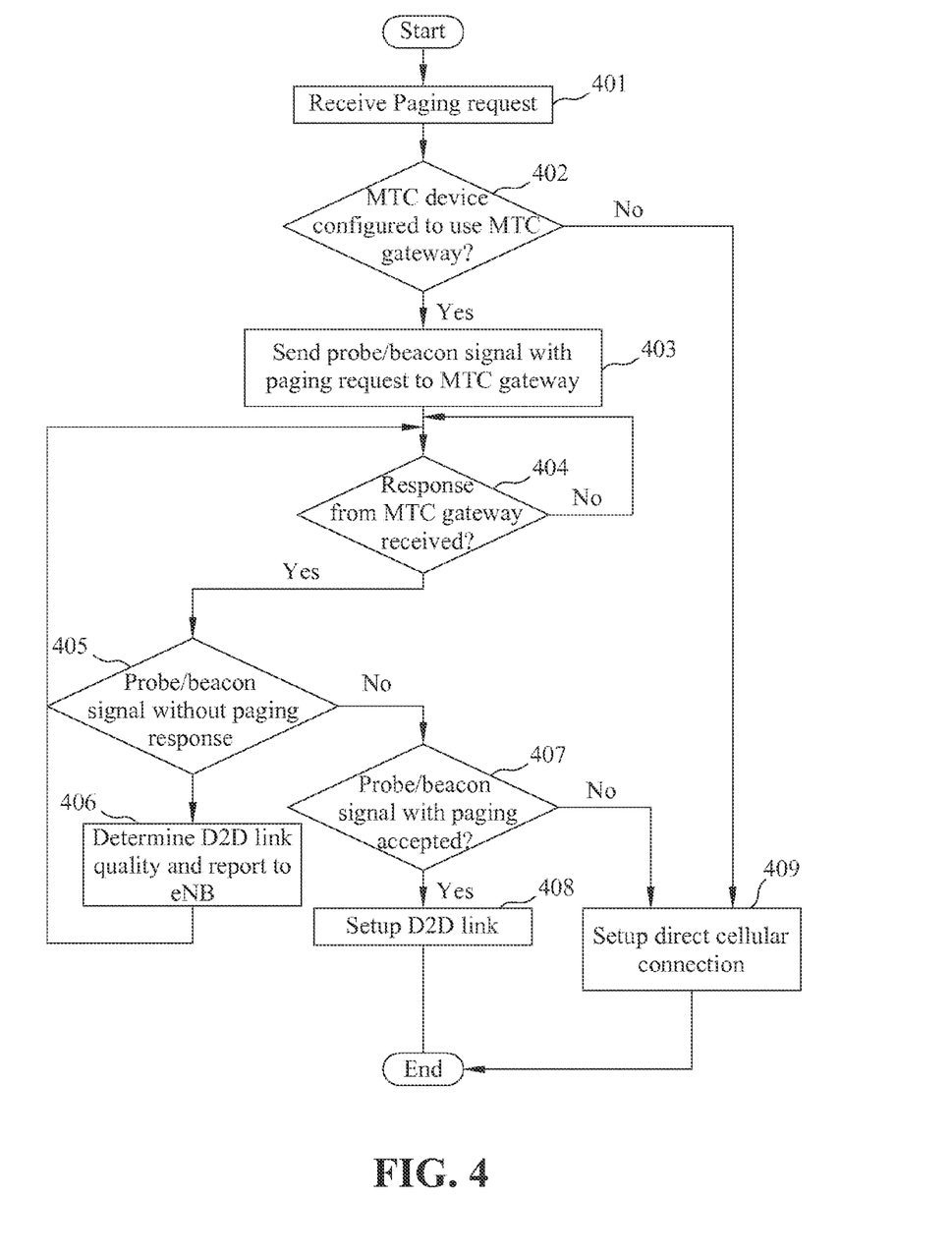
FIG. 4 shows a flowchart of the MTC device process according to an exemplary embodiment of the present disclosure.
Figure 5:
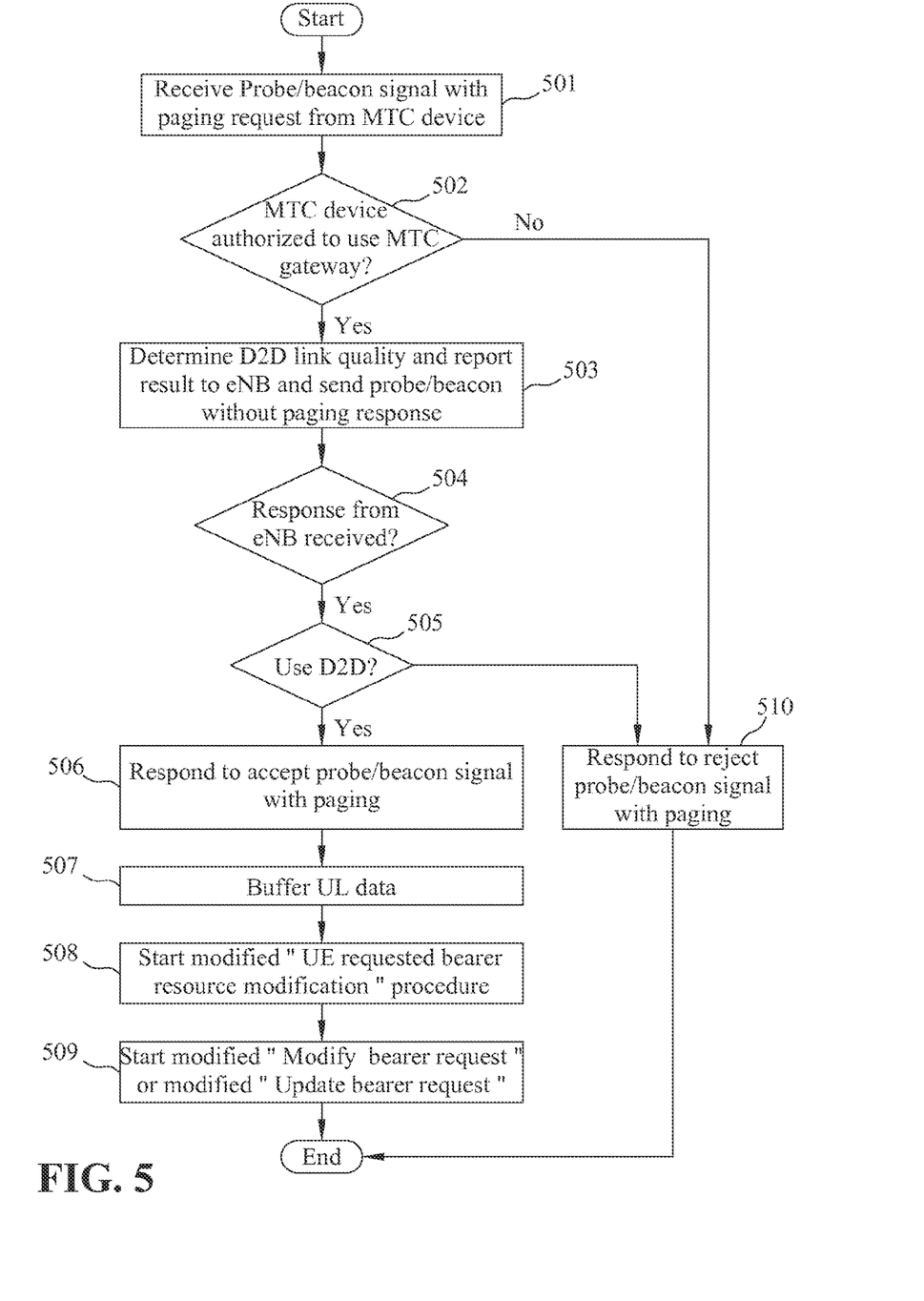
FIG. 5 shows a flowchart of the MTC gateway process according to an exemplary embodiment of the present disclosure.

To facilitate the determination of either to set up D2D connection or direct cellular connection, the present disclosure provides a method for selecting and establishing a D2D communication path in MTC capillary network. The method includes an MTC device process and an MTC gateway process, to be executed on an MTC device and an MTC gateway, respectively. FIG. 4 and FIG. 5 show flowcharts of the MTC device process and MTC gateway process respectively according an exemplary embodiment.

FIG. 4 shows an embodiment of the MTC device process including: receiving a paging request; piggybacking the paging request into a probe/beacon signal and sending said probe/beacon signal piggybacked with said paging request to an MTC gateway, when said MTC device being configured to use said MTC gateway; determining a D2D link quality and report result to an eNB connected to said MTC gateway, when receiving a probe/beacon signal without paging response from said MTC gateway; and when receiving a probe/beacon signal with paging response from said MTC gateway: setting up a D2D communication link, when said received response indicating said probe/beacon signal with paging request being accepted, or, setting up a direct cellular connection when said received response indicating said probe/beacon signal with paging request being rejected.

As shown in FIG. 4, the MTC device process to be executed on MTC device includes the following steps. In step 401, MTC device receives a paging request. Step 402 is to determine whether the MTC device is configured and authorized to use the MTC gateway; and if not, the MTC device proceeds to set up a direct cellular connection as shown in step 409 and then the MTC device process stops. Otherwise, in step 403, the MTC device sends a probe/beacon signal piggybacked with a paging request to the MTC gateway and waits until receiving response from the MTC gateway, as shown in step 404. When the response from the MTC gateway is received as in step 404, the MTC device determines whether the response received from the MTC gateway is a response to probe/beacon signal without paging response, as shown in step 405; if so, the MTC device proceeds to determine D2D link quality and reports result to the eNB (i.e., base station), as in step 406; otherwise, the MTC device determines whether the response indicates that the probe/beacon with paging request is accepted by the MTC gateway, as in step 407; if so, the MTC device proceeds to set up a D2D communication link as shown in step 408, and returning to waiting until receiving a response from said MTC gateway; otherwise, if the response indicates that the probe/beacon signal with paging request has been rejected, the MTC device proceeds to set up a direct cellular connection as shown in step 409. If the Probe/beacon signal w/Paging Request has been rejected (with a Probe/beacon signal with Paging Rejected) then a D2D connection cannot be established. Instead the MTC device needs to setup a direct cellular connection.

FIG. 5 shows an embodiment of the MTC gateway process including: receiving a probe/beacon signal piggybacked with paging request from an MTC device; determining D2D link quality and reporting result to an eNB and sending a probe/beacon without paging response to said MTC device, when said MTC device being authorized to use said MTC gateway; and when receiving a response from said eNB: sending a response to said MTC device to reject said probe/beacon signal with paging request, when the received response indicating not to use D2D communication, or, sending a response to said MTC device to accept said probe/beacon signal with paging request, when the received response indicating to use D2D communication.

Correspondingly, the MTC gateway process shown in FIG. 5 includes the following steps. In step 501, the MTC gateway receives a probe/beacon signal piggybacked with paging request from an MTC device. Step 502 is for the MTC gateway to determine whether the MTC device is authorized to use the MTC gateway; if no, the MTC gateway sends a response to the MTC device to reject the probe/beacon signal with paging request, as shown in step 510, and then the MTC gateway process stops. Otherwise, when the MTC device is determined authorized to use the MTC gateway in step 502, the MTC gateway proceeds to determine D2D link quality and reports result to eNB and sends a probe/beacon without paging response to said MTC device in step 503, and waits for response from eNB, as shown in step 504. When the MTC gateway receives response from eNB in step 504, the MTC gateway determines whether the response from eNB indicates to use D2D, as shown in step 505. When the response from eNB is to use D2D in step 505, the MTC gateway sends a response to the MTC device to accept the probe/beacon signal with paging request, as shown in step 506. Then, the MTC gateway proceeds to execute step 507 to buffer uplink (UL) data after receiving UL data from the MTC device, followed by step 508 to start modified "UE requested bearer resource modification" procedure.

Figure 6:
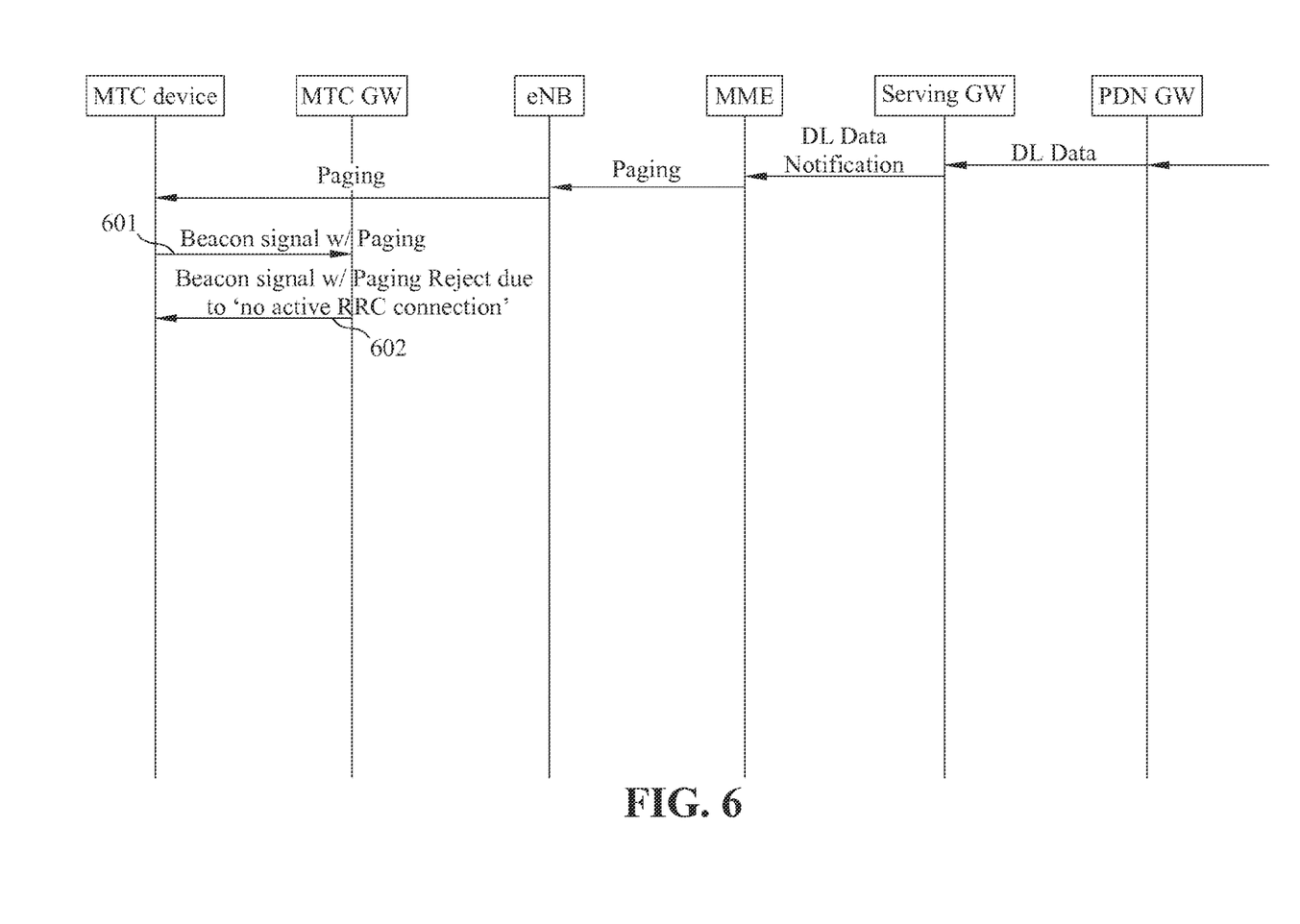
FIG. 6 shows a schematic view of message flow of a scenario in which MTC gateway rejecting D2D connection request according to an exemplary embodiment of the present disclosure.

FIG. 6 shows a schematic view of message flow of a scenario in which MTC gateway rejecting D2D connection request according to an exemplary embodiment. As shown in FIG. 6, MTC device sends a beacon signal with paging to MTC gateway (labeled as 601). When MTC gateway decides that a D2D should be rejected, for example, no active radio resource control (RRC) connection available or MTC gateway overloaded, the MTC gateway sends a beacon signal with paging rejection to MTC device (labeled as 602).

Figure 7:
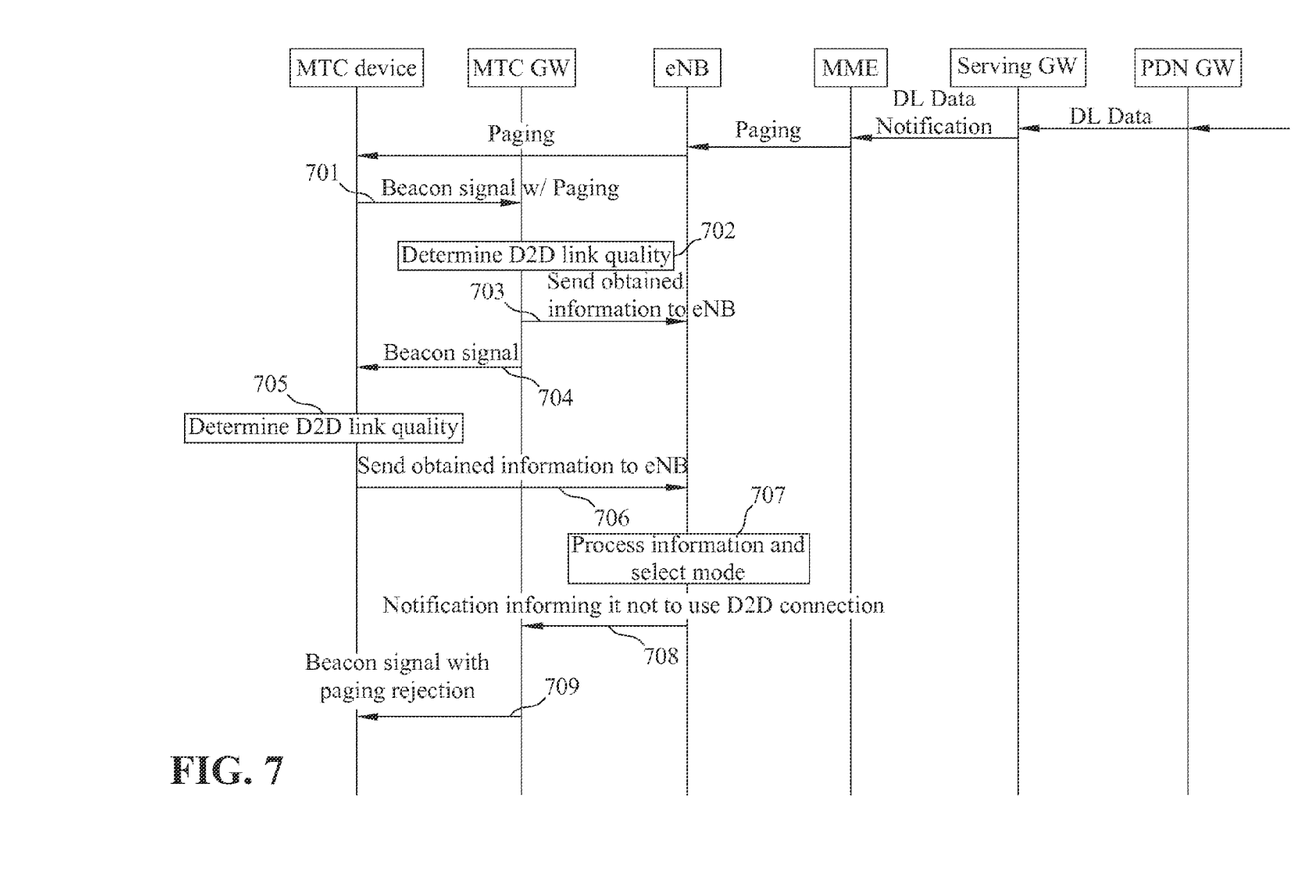
FIG. 7 shows a schematic view of message flow of a scenario in which eNB rejecting D2D connection request according to an exemplary embodiment of the present disclosure.

FIG. 7 shows a schematic view of message flow of a scenario in which eNB rejecting D2D connection request according to an exemplary embodiment. As shown in FIG. 7, MTC device sends a beacon signal with paging to MTC gateway (labeled as 701). When MTC gateway receives the request, MTC gateway determines D2D link quality (labeled as 702) and sends the obtained D2D link quality information to eNB (labeled as 703). MTC gateway also sends a beacon signal to MTC device to request MTC device to determine D2D link quality (labeled as 704). MTC determines D2D link quality (labeled as 705) and sends the obtained D2D link quality information to eNB (labeled as 706). eNB processes information on D2D link quality from MTC device and MTC gateway and selects either D2D or cellular mode for the MTC device (labeled as 707). When D2D link quality is not sufficiently good, eNB sends a notification to MTC gateway informing it not to use a D2D connection (labeled as 708), and MTC gateway sends a beacon signal with paging rejection to MTC device (labeled as 709).

It is worth noting that when the MTC device is not authorized to use the MTC gateway, when the MTC gateway is overloaded, having no active connection to the eNB, or when the eNB determining that using D2D is not beneficial, a reject response is sent to the MTC device to reject said probe/beacon signal with paging request.

Figure 8:
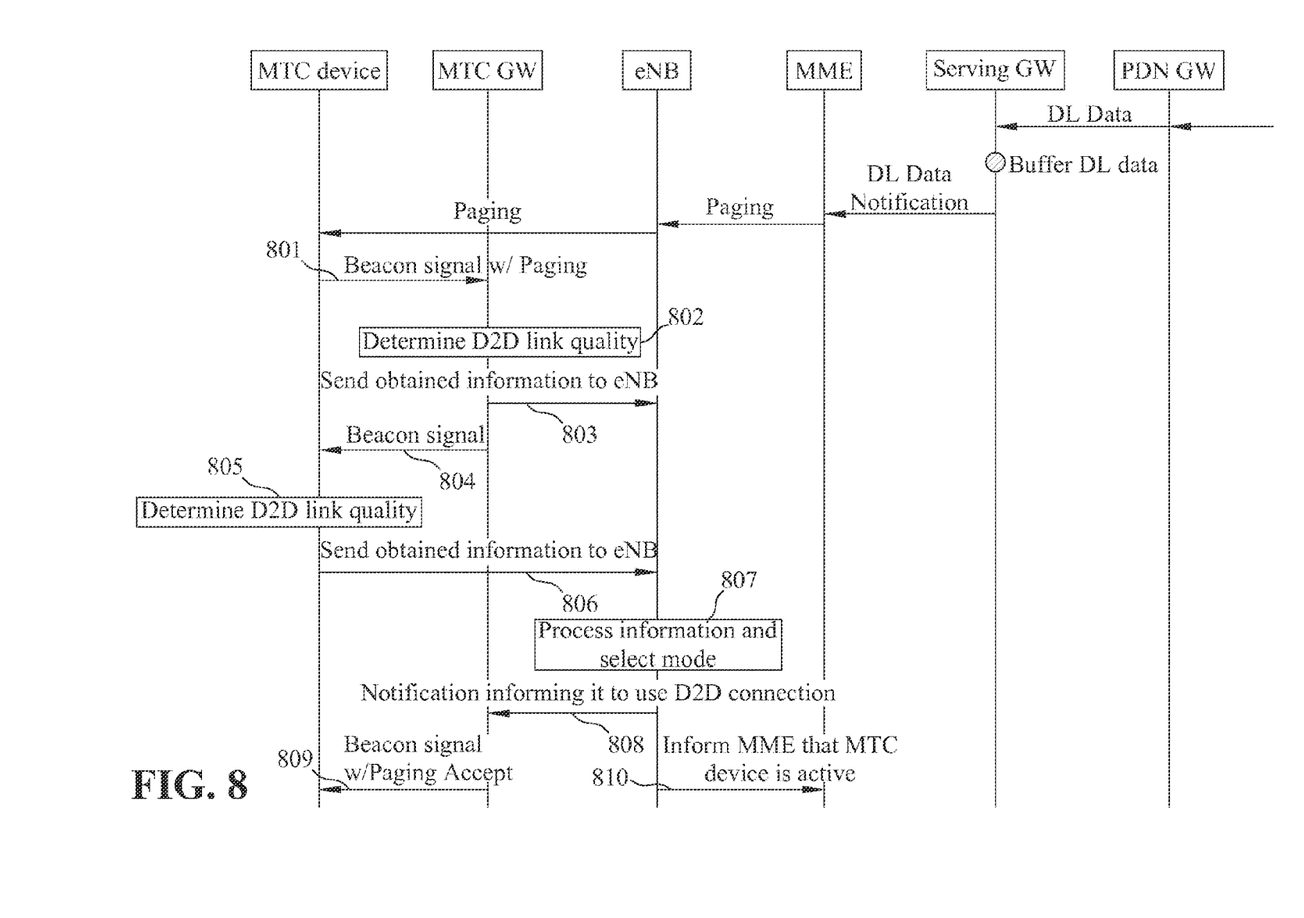
FIG. 8 shows a schematic view of message flow of a scenario in which eNB accepting D2D connection request according to an exemplary embodiment of the present disclosure.

FIG. 8 shows a schematic view of message flow of a scenario in which eNB accepting D2D connection request according to an exemplary embodiment. The messages and operations labeled 801-807 are the same as those labeled as 701-707 in FIG. 7. The difference in this scenario is that eNB sends an acceptance to MTC gateway to use D2D connection (labeled 808), and MTC gateway relays the acceptance through a beacon signal with paging accept to MTC device (labeled as 809). In addition, eNB must also inform MME that MTC device is active (labeled as 810).

Figure 9:
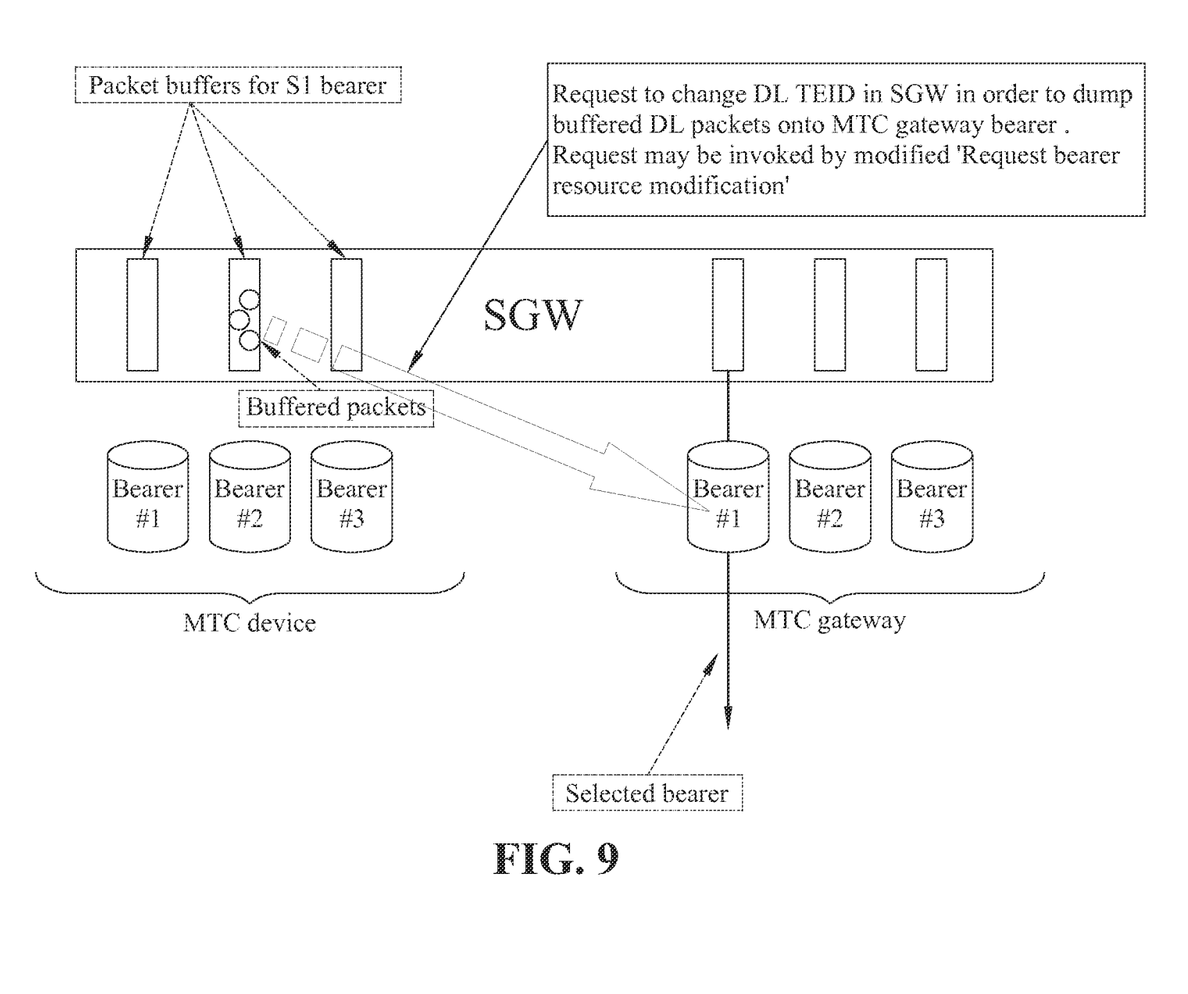
FIG. 9 shows a schematic view of the buffered DL packets dumped from buffers for MTC device in SGW to buffers for MTC gateway in SGW according to an exemplary embodiment of the present disclosure.

It is also worth noting that when the MTC gateway sends a response to the MTC device to indicate accepting the probe/beacon signal with paging request to establish a D2D link. Two issues must also be addressed. The first issue is that when down link packet is available for an MTC device in idle state, this packet needs to be buffered in the SGW until the MTC device has established the appropriate data bearers. However when the system decides to use the alternative bearer path through the MTC gateway, then no direct bearers from the SGW to the MTC device will be established. Hence the system needs to dump the buffered packets onto a bearer that belongs to the MTC gateway, as shown in FIG. 9. FIG. 9 shows a schematic view of the buffered DL packets dumped from buffers for MTC device in SGW to buffers for MTC gateway in SGW according to an exemplary embodiment. To dump the buffered DL packets for the MTC device from buffers for MTC device in SGW to buffers for MTC gateway in SGW, the MTC gateway can send a request to change DL Tunnel Endpoint Identifier (TEID) in SGW to dump buffered DL packets onto MTC gateway bearer. This request can be invoked by a modified UE requested bearer resource modification procedure that is modified from 3GPP standard procedure. As shown in FIG. 9, MTC gateway bearer (#1) selected by modified UE requested bearer resource modification procedure, and buffered DL packets in MTC bearer device (#2) are dumped onto selected MTC gateway bearer (#1).

Figure 10:
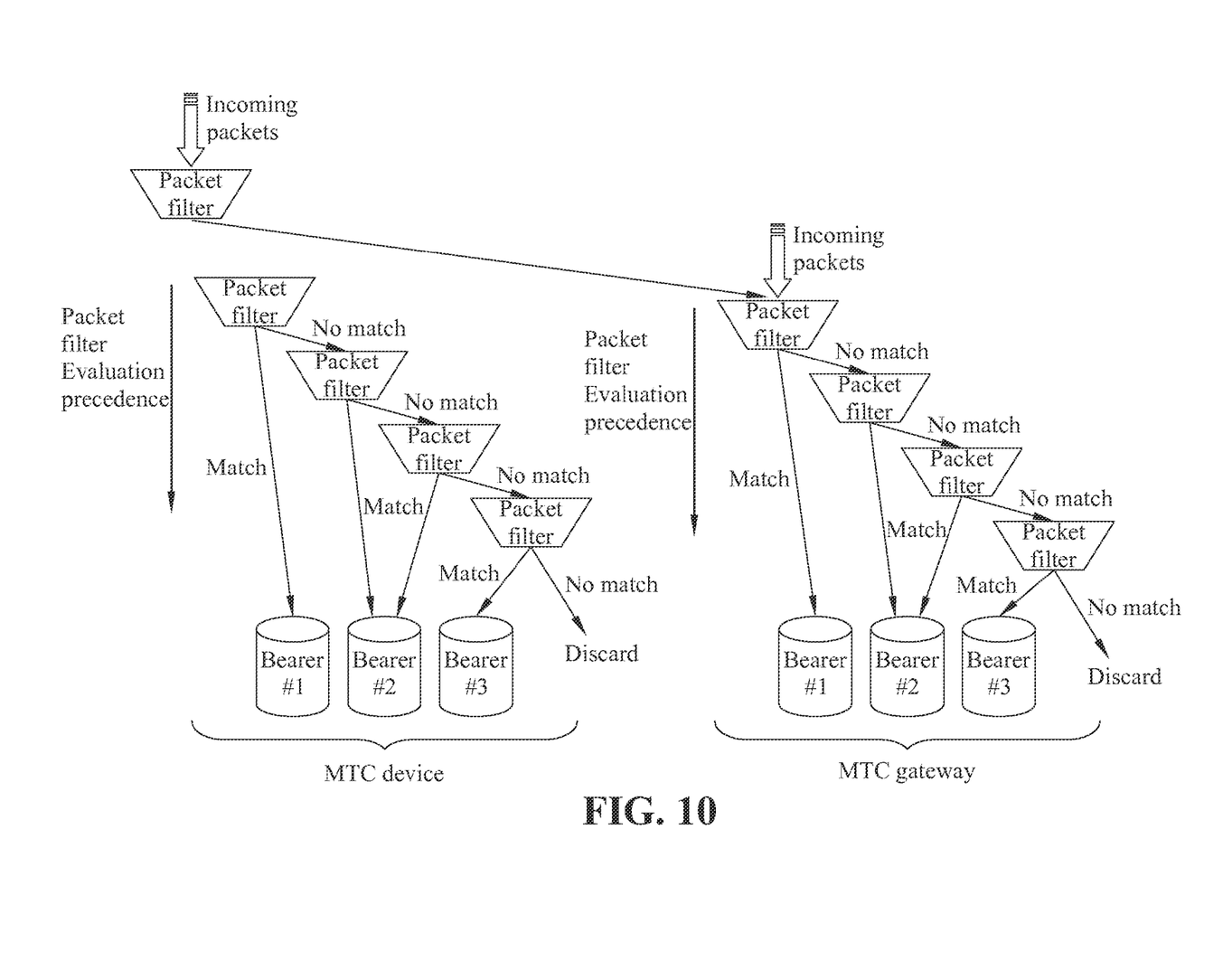
FIG. 10 shows a schematic view of a packet filter with highest packet filter evaluation precedence being added and linked to the MTC gateway packet filter with highest packet filter evaluation precedence according to an exemplary embodiment of the present disclosure.

The second issue is that incoming DL packets into the packet data network (PDN) gateway need to be forwarded onto the bearers that belong to the MTC gateway instead of the bearers that belong to the MTC device. To address this issue, the MTC gateway uses a modified UE requested bearer modification procedure to add a packet filter with highest packet filter evaluation precedence among all the filters in all Traffic Flow Templates (TFTs) associated with the MTC device and links the newly added packet filter to the MTC gateway packet filter with highest packet filter evaluation precedence. FIG. 10 shows a schematic view of a packet filter with highest packet filter evaluation precedence being added and linked to the MTC gateway packet filter with highest packet filter evaluation precedence according to an exemplary embodiment.

Figure 11:
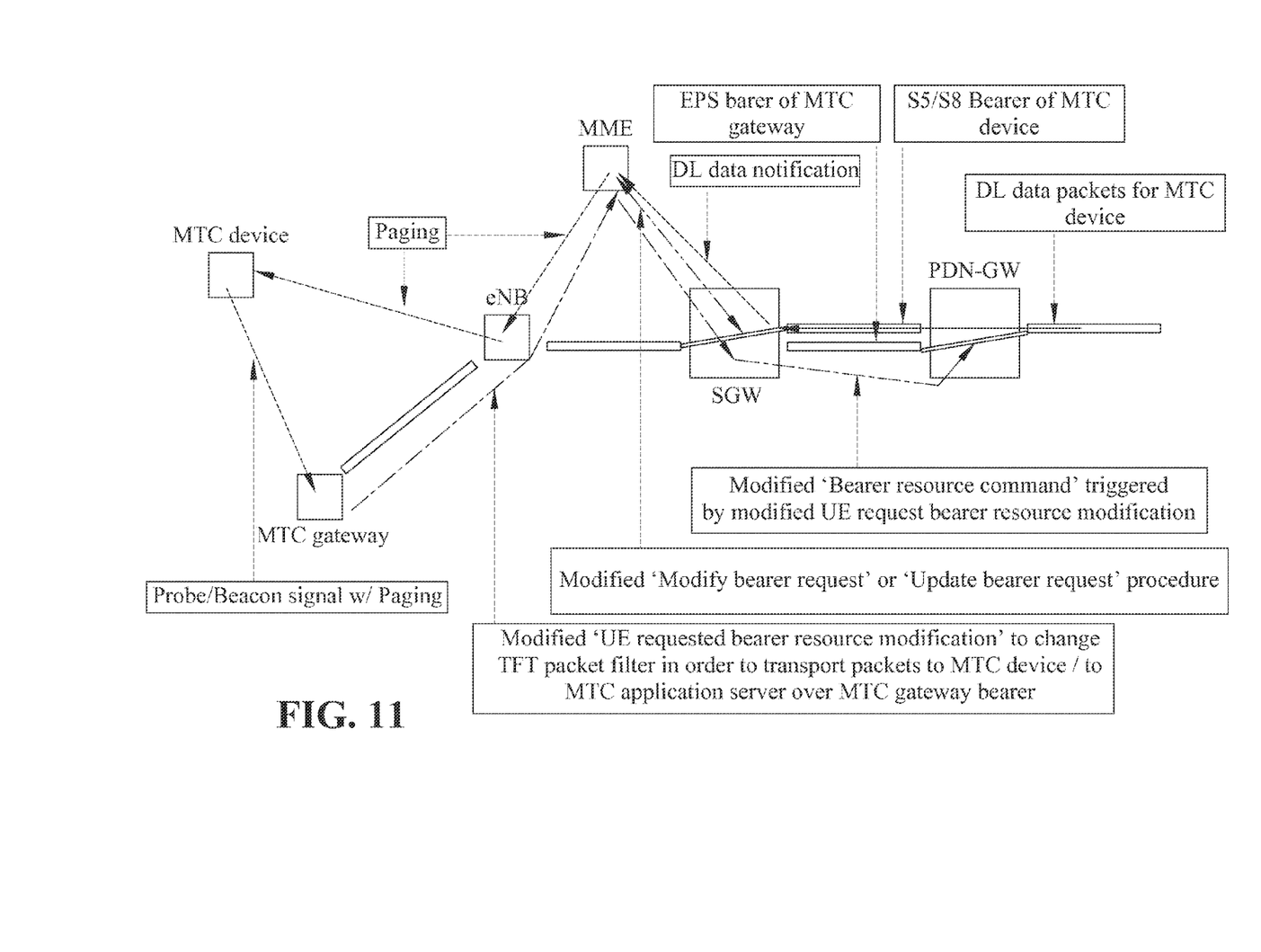
FIG. 11 shows a schematic view of the aforementioned two issues addressed by modified procedures according to an exemplary embodiment of the present disclosure.

FIG. 11 shows a schematic view of the aforementioned two issues addressed by modified procedures according to an exemplary embodiment, including modified UE requested bearer resource modification procedure, modified modify bearer request procedure or modified update bearer request procedure, and modified bearer resource command. As shown in FIG. 11, MTC gateway executes the modified UE requested bearer resource modification procedure to send a message to MME change TFT packet filter to transport packets to MTC device/application server over MTC gateway bearer, which triggers MME to execute a modified bearer resource command to send a message to SGW and then to PDN GW. As such, the issue of incoming DL packets into the PDN gateway needing to be forwarded onto the bearers that belong to the MTC gateway instead of the bearers that belong to the MTC device is resolved, and the subsequent DL packets are transported from PDN GW through SGW and eNB to MTC gateway. On the other hand, the modified modify bearer request procedure or the modified update bearer request is executed by MME and SGW to resolve the first issue of dumping the buffered DL packets onto a bearer that belongs to the MTC gateway by changing DL TEID in SGW.

It is also worth noting that when MME receives the Request bearer resource modification message, the MME needs to validate the request to check if the MTC gateway is allowed to add packet filter for MTC devices. Also, the PDN GW needs to be able to process enhanced bearer resource command.

Figure 12:
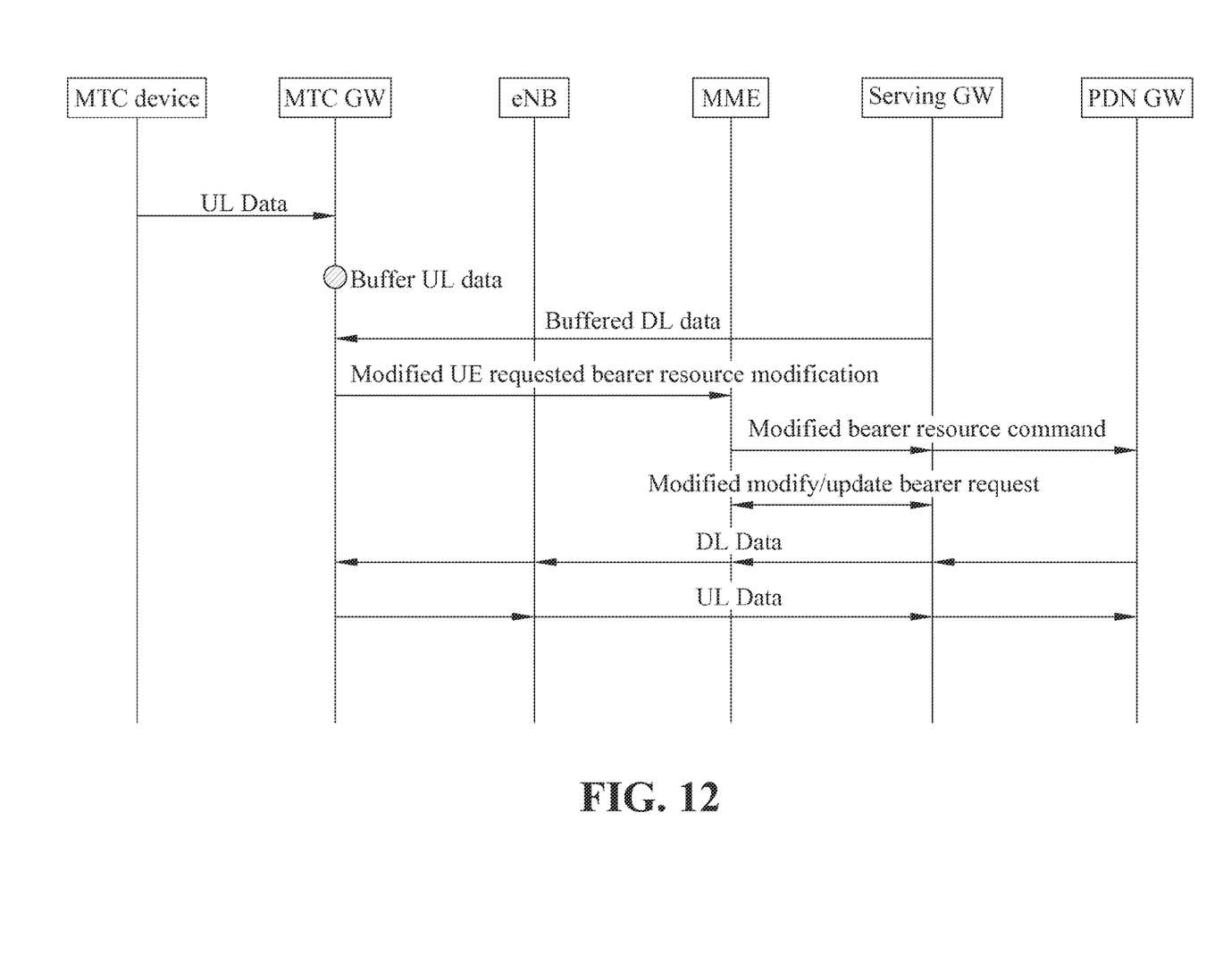
FIG. 12 shows a schematic view of message flow of a scenario after eNB accepting D2D connection request in FIG. 8.

FIG. 12 shows a schematic view of message flow of a scenario in which the aforementioned two issues resolved after eNB accepting D2D connection request in FIG. 8. As shown in FIG. 12, UL packets from MTC device are buffered at MTC gateway. After the modified UE requested bearer resource modification procedure, modified modify bearer request procedure or modified update bearer request procedure, and modified bearer resource command are executed respectively, the DL packets and UL packets are able to flow transported correctly in the newly established D2D connection.

In summary, the present disclosure describes a method for selecting and establishing a D2D communication path in MTC capillary network, the MTC capillary network having a plurality of MTC devices and an MTC gateway, the method including: receiving a paging request by said MTC device; piggybacking a paging request into a probe/beacon signal and sending said probe/beacon signal piggybacked with said paging request to said MTC gateway when said MTC device determining being configured to use an MTC gateway, and waiting until receiving a response from said MTC gateway; receiving a probe/beacon signal piggybacked with paging request from said MTC device by said MTC gateway; determining D2D a link quality and reporting result to an eNB and sending a probe/beacon without paging response to said MTC device when said MTC gateway determining said MTC device being authorized to use said MTC gateway; when said MTC gateway receiving a response from said eNB, said MTC gateway: sending a response to said MTC device to reject said probe/beacon signal with paging request when the received response from said eNB indicating not to use a D2D communication, or, sending a response to said MTC device to accept said probe/beacon signal with paging request when the received response indicating to use a D2D communication; when said MTC device receiving a response from said MTC gateway, said MTC device: proceeding to determine a D2D link quality and reporting result to an eNB connected to said MTC gateway when said received response from said MTC gateway being a probe/beacon signal without paging response, and returning to waiting until receiving a response from said MTC gateway; and setting up a D2D communication link when said received response from said MTC gateway indicating that said probe/beacon signal with paging request being accepted, or, setting up a direct cellular connection, when said received response from said MTC gateway indicating said probe/beacon signal with paging request being rejected.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for selecting and establishing a device-to-device (D2D) communication path in Machine-Type Communication (MTC) capillary network, executed on an MTC device, comprising:
   receiving a paging request;
   piggybacking the paging request into a probe/beacon signal and sending said probe/beacon signal piggybacked with said paging request to an MTC gateway, when said MTC device being configured to use said MTC gateway;
   determining a D2D link quality and report result to an eNB connected to said MTC gateway, when receiving a probe/beacon signal without paging response from said MTC gateway; and
   when receiving a probe/beacon signal with paging response from said MTC gateway: setting up a D2D communication link, when said received response indicating said probe/beacon signal with paging request being accepted, or, setting up a direct cellular connection when said received response indicating said probe/beacon signal with paging request being rejected.

2. The method as claimed in claim 1, comprising: setting up a direct cellular connection when said MTC device not being configured to use MTC gateway.

3. A method for selecting and establishing a device-to-device (D2D) communication path in Machine-Type Communication (MTC) capillary network, executed on an MTC gateway, comprising:
    receiving a probe/beacon signal piggybacked with paging request from an MTC device;
    determining D2D link quality and reporting result to an eNB and sending a probe/beacon without paging response to said MTC device, when said MTC device being authorized to use said MTC gateway; and
    when receiving a response from said eNB:
    sending a response to said MTC device to reject said probe/beacon signal with paging request, when the received response indicating not to use D2D communication, or,
    sending a response to said MTC device to accept said probe/beacon signal with paging request, when the received response indicating to use D2D communication.

4. The method as claimed in claim 3, comprising: sending a reject response to said MTC device to reject said probe/beacon signal with paging request, when said MTC device not being authorized to use said MTC gateway.

5. The method as claimed in claim 3, comprising: sending a reject response to said MTC device to reject said probe/beacon signal with paging request, when the MTC gateway is overloaded, or the MTC gateway has no active connection to the eNB.

6. The method as claimed in claim 3, comprising: sending a reject response to said MTC device to reject said probe/beacon signal with paging request, when the MTC gateway receives a notification from the eNB informing it not to use a D2D connection.

7. The method as claimed in claim 3, wherein sending a response to said MTC device to accept said probe/beacon signal with paging request further comprises:
    buffering a UL data from the MTC device;
    starting a modified "UE requested bearer resource modification" procedure; and
    starting a modified "modify bearer request" or modified "update bearer request".

8. The method as claimed in claim 7, wherein said modified "UE requested bearer resource modification" procedure further comprises: said MTC gateway sending a modified Bearer resource modification request to add a packet filter with highest packet filter evaluation precedence among all packet filters in all TFTs associated with said MTC device and links said newly added packet filter to said MTC gateway packet filter with highest packet filter evaluation precedence.

9. The method as claimed in claim 8, wherein said modified UE requested bearer resource modification procedure further comprises: sending a message to MME to change TFT packet filter to transport packets to said MTC device/application server over MTC gateway bearer, which triggers MME to validate said request by checking whether MTC gateway being allowed to add packet filter for MTC devices and executing a modified bearer resource command to send a message to SGW and then to PDN GW to enable incoming DL packets into PDN gateway needing to be forwarded onto bearers belonging to said MTC gateway instead of bearers belonging to said MTC device.

10. The method as claimed in claim 7, wherein the procedure "UE requested bearer resource modification" comprises executing a modified modify bearer request procedure or a modified update bearer request for dumping buffered DL packets onto a bearer belonging to said MTC gateway by changing DL TEID in SGW.

11. A method for selecting and establishing device-to-device (D2D) communication path in Machine-Type Communication (MTC) capillary network, said MTC capillary network having a plurality of MTC devices and an MTC gateway, comprising:
    receiving a paging request by said MTC device;
    piggybacking a paging request into a probe/beacon signal and sending said probe/beacon signal piggybacked with said paging request to said MTC gateway when said MTC device determining being configured to use an MTC gateway, and waiting until receiving a response from said MTC gateway;
    receiving a probe/beacon signal piggybacked with paging request from said MTC device by said MTC gateway;
    determining D2D a link quality and reporting result to an eNB and sending a probe/beacon without paging response to said MTC device when said MTC gateway determining said MTC device being authorized to use said MTC gateway;
    when said MTC gateway receiving a response from said eNB, said MTC gateway: sending a response to said MTC device to reject said probe/beacon signal with paging request when the received response from said eNB indicating not to use a D2D communication, or, sending a response to said MTC device to accept said probe/beacon signal with paging request when the received response indicating to use a D2D communication; when said MTC device receiving a response from said MTC gateway, said MTC device: proceeding to determine a D2D link quality and reporting result to an eNB connected to said MTC gateway when said received response from said MTC gateway being a probe/beacon signal without paging response, and returning to waiting until receiving a response from said MTC gateway; and
    setting up a D2D communication link when said received response from said MTC gateway indicating that said probe/beacon signal with paging request being accepted, or, setting up a direct cellular connection, when said received response from said MTC gateway indicating said probe/beacon signal with paging request being rejected.

12. The method as claimed in claim 11, wherein said MTC gateway sending a response to said MTC device to accept said probe/beacon signal with paging request, further comprises:
    buffering a UL data from said MTC device;
    starting a modified "UE requested bearer resource modification" procedure; and
    starting a modified "modify bearer request" or modified "update bearer request".

13. The method as claimed in claim 12, wherein said MTC gateway executes a modified UE request bearer modification procedure to add a packet filter with highest packet filter evaluation precedence among all filters in all TFTs associated with said MTC device and links said added packet filter with highest packet filter evaluation precedence to said MTC gateway packet filter with highest packet filter evaluation precedence.

14. The method as claimed in claim 13, wherein said modified UE requested bearer resource modification procedure also sends a message to an MME to change a TFT packet filter to transport packets to said MTC device/application server over an MTC gateway bearer, which triggers said MME to validate said request by checking whether MTC gateway being allowed to add packet filter for MTC devices and execute a modified bearer resource command to send a message to an SGW and then to a PDN GW to enable incoming DL packets into said PDN GW needing to be forwarded onto bearers belonging to said MTC gateway instead of bearers belonging to said MTC device.

15. The method as claimed in claim 12, wherein said MTC gateway starting a modified "UE requested bearer resource modification" procedure further comprises executing a modified modify bearer request procedure or a modified update bearer request for dumping buffered DL packets onto a bearer belonging to said MTC gateway by changing a DL TEID in SGW.

16. The method as claimed in claim 11, comprising: said MTC device setting up a direct cellular connection by said MTC device, when said MTC device not being configured to use an MTC gateway.

17. The method as claimed in claim 11, comprising: sending a reject response to said MTC device to reject said probe/beacon signal with paging request, when said MTC gateway determining said MTC device not being authorized to use said MTC gateway.

18. The method as claimed in claim 11, comprising: sending a reject response to said MTC device to reject said probe/beacon signal with paging request, when the MTC gateway is overloaded, or the MTC gateway has no active connection to the eNB.

19. The method as claimed in claim 11, comprising: sending a reject response to said MTC device to reject said probe/beacon signal with paging request, when the MTC gateway receives a notification from the eNB informing it not to use a D2D connection.

* * * * *